United States Patent [19]

Greck

[11] Patent Number: 4,481,874
[45] Date of Patent: Nov. 13, 1984

[54] WIRE MEAT SUPPORT

[75] Inventor: Edward T. Greck, Amherst, N.Y.

[73] Assignee: Neat Products, Inc., Amherst, N.Y.

[21] Appl. No.: 492,385

[22] Filed: May 6, 1983

[51] Int. Cl.³ .............................................. A47J 37/04
[52] U.S. Cl. ...................................... 99/419; 211/181;
248/175
[58] Field of Search ..................... 99/419, 426; 211/29,
211/181; 248/175; 29/7; 426/128, 523

[56] References Cited

U.S. PATENT DOCUMENTS

| | | | |
|---|---|---|---|
| 1,090,840 | 3/1914 | Dougherty | 211/125 |
| 1,308,253 | 7/1919 | Oftedahl | 211/125 X |
| 1,369,742 | 2/1921 | Halpin | 211/181 X |
| 1,842,011 | 1/1932 | Brunswick | 211/181 X |
| 2,458,239 | 1/1949 | Bartlett | 99/419 |

FOREIGN PATENT DOCUMENTS

| | | | |
|---|---|---|---|
| 15288 | of 1893 | United Kingdom | 29/7 |
| 592641 | 9/1947 | United Kingdom | 99/419 |

*Primary Examiner*—Billy J. Wilhite
*Assistant Examiner*—Christine A. Peterson
*Attorney, Agent, or Firm*—James J. Ralabate

[57] ABSTRACT

This invention relates to a food support to be used during cooking meat, and, more specifically, to a novel and useful support apparatus for cooking meat, poultry and the like.

16 Claims, 9 Drawing Figures

WIRE MEAT SUPPORT

BACKGROUND OF THE INVENTION

When meat is to be cooked or roasted, it invariably is in contact with the bottom of the cooking vessel, usually resulting in adhering of the bottom portion of the meat to the roasting pan as it cooks. This results in a scorched pan and an under- or unevenly-cooked meat portion. The juices or gravy formed during the cooking are generally wasted since it is singed with the bottom portion of the meat. The gravy that is formed is generally not available to the cook before the cooking is completed since to remove the gravy usually means removing the meat first. Constant removing of the meat results in lengthening of the cooking time and an interruption in the uniform cooking of the meat. The meat in the roasting process generally remains immersed in the meat juices or grease, and has a tendency to reabsorb the grease flowing around it. If the moisture content of the meat is low, the lower portion of the roast is, in effect, fried to a crust. If the moisture content of the meat is high, the lower part of the roast is stewed in the meat juices and grease, and much flavor is lost.

Contact of the meat with the bottom of the cooking pan in addition to retarding uniform cooking, causes a difficult cleaning problem. The portion of the pan that is in contact with the bottom of the roast usually requires scouring and substantial rubbing with cleaning pads or soap to remove the scorched crust formed thereby. As noted above, the gravy and grease usually burn away or are absorbed by the meat portion when the roast or poultry is in direct contact with the bottom of the cooking pan. Thus, prior cooking devices where the roast is in contact with the pan causes the constant rise in the rendered liquid constituents resulting from the cooking operation. This results in grease saturation of the lower portion of the roast, heat charring of the meat and pan, and consequent sticking of the roast to the receptacle where heat concentration is relatively great.

There are known apparatus for holding the meat above the bottom of the cooking vessel; however, many of these are integral with the pan itself and these raised portions are themselves scorched or encrusted by the grease formed. Also being fixed to the pan, these support portions cannot be used if the meat is to be cooked in portions at variance with the size of the pan. Other devices used during roasting of meats are expensive to manufacture and ackward to use. Those movable supports that have been used are generally sharp ended or pointed metal that could cause a safety problem. Because of these drawbacks, few meat support devices have attained any marked commercial success.

A meat support device disclosed in copending application Ser. No. 297,701, filed Aug. 31, 1981, (now abandoned) comprises a device having the configuration of a segment of a cylinder. A triangular prong is integral with this segment and extends upwardly therefrom. This device is very beneficial in avoiding the problems encountered by the other prior art supports. The present invention is an improvement on the support disclosed in this earlier filed application.

SUMMARY OF THE INVENTION

It is therefore an object of this invention to provide a meat support and cooking device devoid of the above noted disadvantages.

Another object of this invention is to provide a cooking aid for holding a roast above the surface of a cooking pan and isolates the meat from the greases and meat juices formed during cooking.

Another further object of this invention is to provide a movable meat support device that is economical and easy to use.

A further object is to provide a meat support which eliminates the charring and burning of the bottom of the pan during the cooking operation.

A still further object of this invention is to provide a safe, yet efficient device to use to assist in uniformly cooking on all sides meats, poultry and the like.

Another still further object is to provide a cooking aid that can be removably secured to the bottom portion of a roast and supports it at either varied or at a uniform distance from the bottom of the cooking vessel.

Still another further object is to provide a meat support that promotes even cooking of the roast, and yet reduces cooking time of same.

The foregoing objects and others are accomplished in accordance with this invention by providing a meat support to be used in cooking or roasting which comprises substantially wire supports having an upwardly projecting prong or prongs. The wire is bent into a form having a support portion and a prong portion. The wire can be of any thickness, generally the thickness similar to a coat hanger is suitable. The wire material may be of any suitable material, typical materials are steel, aluminum, copper, other metals, inert plastics or sunthetics, fiberglass, and mixtures thereof.

The prong is integral with the support portion and extends therefrom in the form of a sharpened and elongated wire. The length of the prong is about equal to the length of each leg or supporting portion. This permits near maximum length for the prong and provides deeper and more secure penetration into the meat or poultry. The supports of this invention are adapted to be used in the bottom portion of a meat roast in any desired spaced arrangement. Usually three or four of these supports will be used to support all parts of the lower portion of the roast. This provides firm support for the meat above the bottom of the roasting pan and above the gravy or juice which normally collects there.

The devices or supports of this invention are easily and economically manufactured. The device can be formed from a piece of wire by bending the wire into the desired configuration. A prong is formed out of the center portion of the device and can be from the same or different piece of wire as the leg or support portion. In preferred embodiment the device has rounded end portions and a prong at approximately the center of the piece, the prong projecting upwardly from this mid portion. The rounded ends are adapted to rest in rounded point contact with the bottom of a cooking pan.

Alternatively, the supports of this invention can be manufactured or molded from any suitable plastic or synthetic material having the proper physical properties. Proper temperature and inert properties are necessary for use with food. Typical suitable plastic materials include high density polymeric materials such as polyamides, polyvinyl chloride, polyethylene, polycarbonates, polyurethanes, or any other suitable polymer or plastic.

The configuration of this plastic embodiment will resemble the metal wire embodiment in all respects except for the material from which it is made. Generally, the invention involves a support for a meat portion to be cooked, which comprises a wire base support section and prong means attached thereto, said base support section comprising a one piece wire portion bent into a support having a pair of rounded end portions adapted to contact and rest in rounded point contact with the bottom surface of a cooking pan, and having an integral intermediate portion at a substantially higher elevation than said rounded end portions, said end portions and said intermediate portion forming substantially a semi-circle when viewed in side elevation, and an upwardly directed prong extending from said intermediate portion for piercing engagement with said meat.

In another embodiment of this invention, supports made from a metal or plastic wire have a plurality of prongs which can act as either the support legs or the prong. Each of the prongs can be of the same or varied length. This embodiment is shown in FIG. 2.

The preferred support of this invention, therefore, is constructed of a thick wire similar in thickness to a wire coat hanger. The wire is bent into any suitable form, for example, one having a semi-circular configuration with an upwardly projecting prong. This device is easy to manufacture and convenient to pack and ship in several units. The wire may have a one component or a wire coated structure and be of any suitable material; typical materials for the wire itself or the coating are steel, aluminum, other metals, inert and non-toxic plastics or synthetics, fiber glass and mixtures thereof. Several embodiments will be more fully described in reference to the accompanying drawings.

PREFERRED EMBODIMENT OF THE INVENTION

The present invention provides individual support devices which are adapted to be applied to the bottom of a cut of meat or a poultry item in any desired spacing or arrangement. Usually three or four such support devices will be used in combination to support all parts of the roast firmly in an elevated position above the bottom of the roasting pan and above the gravy or juice which normally collects there.

The support devices of the present invention comprise very simple metal wires, coated or non-coated, which can be easily cleaned and may be stored in a small space when not in use. Each support comprises a wire bent into a shape having a support or base portion and a prong. The support portion is adapted to rest at its opposite ends on the bottom of the roasting pan and has a tong or prong struck upwardly approximately midpoint therefrom.

It is important in optimumly preferred embodiments shown in FIGS. 1, 3, 4, 5, 7, 8 and 9 that the support end portions can be rounded for proper stability when they are inserted into the meat or poultry. Generally, three or four support devices of this invention are used at one time, and the configuration of the rounded ends provides a means of maintaining the desired distance from the bottom of the cooking vessel. If the ends were squared or not rounded, the meat would not be properly supported especially in those cases where the bottom meat surface was irregular. In the present invention, the pan bottom can contact any point on the circumference of the support ends, and still all of the supports used will maintain pan contact.

DESCRIPTION OF THE DRAWING AND PREFERRED EMBODIMENTS

Figure 1:
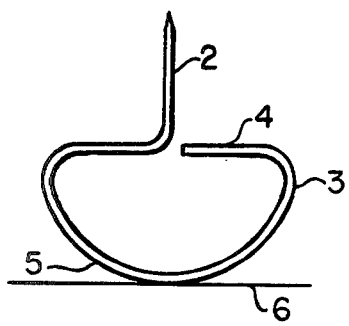
FIG. 1 is a perspective view of one form of the meat support of the present invention constructed from a single wire piece.

In FIG. 1, a meat support is illustrated having a substantially semi-circular configuration with a prong 2 extending upward from approximately the midpoint of the diameter of said structure. The support wire base portion 3 comprises a substantially flat or even portion 4 which supports the surface of the meat, fish or poultry. The rounded base portion 5 provides a means for contacting and resting in rounded point contact with the bottom 6 of a cooking pan. This rounded bottom 5 allows the support to be placed in the meat in any position and still achieve appropriate support for the meat. It is not necessary that the support be inserted into the meat in a perfectly perpendicular manner as do most prior art supports. In addition, this wire support will be somewhat resilient thereby providing a somewhat spring locking effect when inserted into the meat. Portion 4 will be spring pressed against the surface of the meat and provide good support irrespective of the inserted position.

Figure 2:
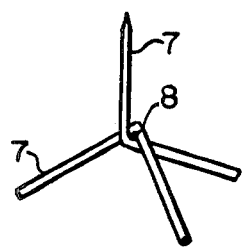
FIG. 2 is a perspective of another embodiment of this invention wherein wire pieces are connected to form the prong and leg portions.

In FIG. 2, an embodiment is illustrated having four legs or prongs 7 connected together at point 8 by soldering or welding or any other suitable means. In this embodiment the wire base portion comprises three legs 7 and a prong 7. Of course, each wire extension can act as a leg or the prong. These legs 7 may act as the support legs or as the prong depending on the position desired. The legs 7 can be of the same or varied length so that any desired height can be achieved. This wire embodiment also provides a somewhat resilient support as do the other embodiments shown in the remaining figures. Legs 7 can all be pointed, if desired.

Figure 3:
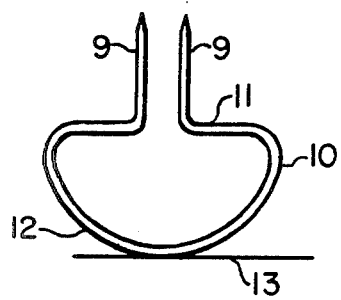
FIG. 3 is a perspective view of an embodiment similar to FIG. 1 with two prongs.

In FIG. 3, a structure similar to FIG. 1 is shown with two prongs 9 rather than one prong. The base portion 10 is also in the configuration of an approximate semi circle, having two prongs 9 extending upward from the diameter or flat portion 11. The rounded bottom 12 permits rounded point contact with the surface of the cooking vessel 13. As with the embodiment shown in FIG. 1, the embodiment shown in FIG. 3 provides a bonus effect of spring locking when the prongs 9 are inserted into the meat. An outward pressure is provided which holds the meat in any desired position. The support of FIG. 3 can be easily manufactured from a single piece of wire having at its one terminal portion the first prong 9 and at its opposite terminal portion the other prong 9.

Figure 4:
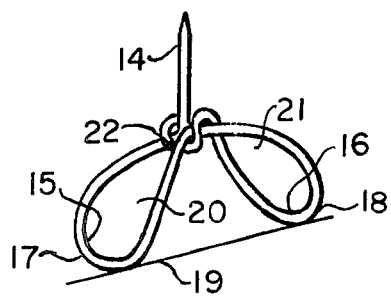
FIG. 4 is a perspective view of another embodiment bent from a single wire piece.

FIG. 4 illustrates a support also constructed of one piece of wire having a prong 14 and wherein the wire is double looped as shown at 15 and 16. These loops form the rounded leg portions 17 and 18 that facilitate rounded point contact with the bottom of a cooking vessel 19. This wire support is similar in configuration to the meat support device described in copending application Ser. No. 297,701 filed Aug. 31, 1981, except the device in FIG. 4 is constructed of wire and the support of said copending application is constructed from a flat piece of metal, or molded into a flat piece of plastic.

In FIG. 4, the support has no surface at voids or spaces 20 and 21. The support is a wire bent into shape and having one wire end at prong 14 and the other at wire end 22.

Figure 5:
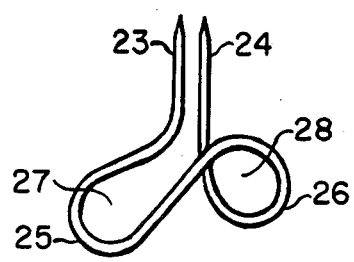
FIG. 5 is a perspective view of an embodiment similar to FIG. 4 with two prongs.

FIG. 5 shows a configuration similar to that of FIG. 4 except with double prongs 23 and 24. Rounded ends 25 and 26 allow point contact with the bottom of a cooking vessel similar to that shown in FIG. 4. As in FIG. 4, there are voids 27 and 28 between loops. The one piece wire construction of the supports of this invention are easy to manufacture and economical. Because of their dimensions, they are convenient to ship and pack. The wire support of FIG. 5 has as one of its end portions prong 23 and the opposite end of the wire is prong 24. Since ends 25 and 26 are rounded, the support may be inserted into the meat in any position and need not be inserted in a perfectly perpendicular fashion. This, of course, is the case with all the wire embodiments of this invention except as shown in FIG. 2.

Figure 6:
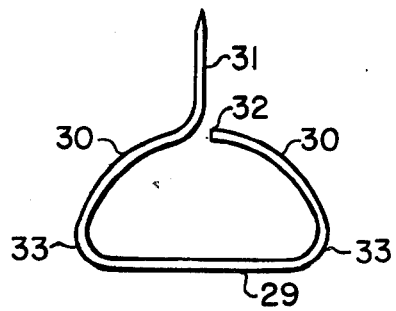
FIG. 6 is a perspective view of a one piece wire embodiment having an inverted semi-circular structure.

In FIG. 6, a one piece wire support is shown wherein the base portion 29 is flat or level. This embodiment illustrates a support having a substantially semi-circular configuration wherein the diameter portion of the circle acts as the base 29. The configuration of any of the embodiments shown in all figures can be slightly flatter than a semi-circle or can deviate from a true semi-circle if for any reason this configuration is preferred. In FIG. 6, the rounded support portions 30 allow for a meat support section from which prong 31 projects. One end of this one piece wire support structure is prong 31 and the opposite end is shown at 32. Support base portions 33 preferably are rounded to provide a degree of rounded point contact with the surface of a cooking vessel. While the freedom to insert the support into the meat in any direction is not as wide as when using supports of FIG. 1, 3, 4, 5, 7, 8 and 9, the support of FIG. 6 does provide adequate flexibility in this regard.

Figure 7:
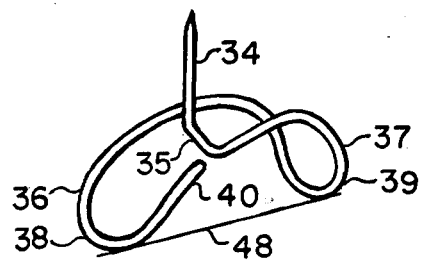
FIG. 7 is a perspective view of a support similar to FIG. 4 with a prong support cross bar.

FIG. 7 depicts a support similar to that of FIG. 4 except in FIG. 7 a prong base support 35 is utilized. The wire is bent into a configuration having a double loop as shown in 36 and 37 with wire end portions 38 and 39 on at about substantially the same plane. They are shown in the drawing as being substantially less than the same plane merely for illustration purposes. Prong 34 and prong base 35 are than integral to this one piece wire structure and extends one piece through wire end portion 40. The raised semi circular configuration of this support permits the meat to be maintained above the level of pan bottom 48.

Figure 8:
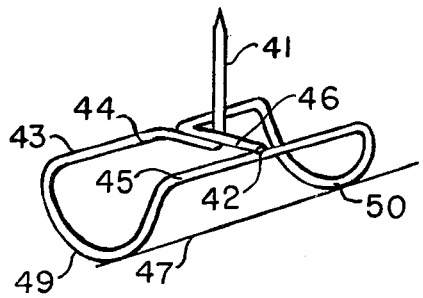
FIGS. 8 and 9 are embodiments having substantially flat meat support portions and rounded support end portions.

In FIG. 8, a one piece wire support is shown having at one end a prong 41 and at the opposite wire end terminal portion 42. This support has flat base meat support 43 comprising parallel wire structures 44 and 45 and support cross piece 46. The flat base support 43 is held above the level of the bottom of a cooking pan 47. The end portions of the support are rounded as shown at 49 and 50. Cross piece 46 provides both lateral strength to the device and at the same time allows for improved meat support when in use. It will also fall to its side as will all of the other embodiments shown herein (except the device of FIG. 3), thereby preventing any undesirable contact with the sharpened prong when not in use. Each end portion 49 and 50 is of a semi-circular configuration so that rounded point contact may be made with pan bottom 47 when in use. The length of parallel structures 44 and 45 may vary depending upon the desired pan size, etc.

Figure 9:
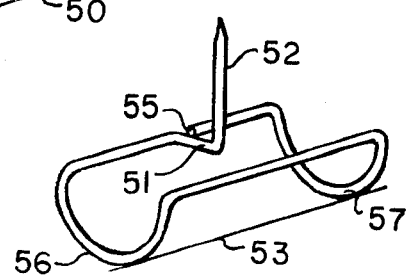

FIG. 9 shows a device similar in configuration to the device of FIG. 8 except that the cross bar or section 46 of FIG. 8 is omitted. In FIG. 9, a partial cross section 51 is located at the base of prong 52 and extends parallel to pan bottom 53. The one piece unit extends from prong 52 to wire end 55. Rounded ends 56 and 57 permit easy positioning of the support when in use.

While double prongs can be used in any of the embodiments shown in all the Figures, it is preferred that one prong be used for ease of manufacture and convenience of use. Also, the cross piece or base 35 shown in FIG. 7 can be used in any of the other embodiments if desirable, especially in FIG. 5. This cross piece 35 may strengthen the structure and provide in some cases a better support for the meat. In most cases, three or four support units will be used when cooking meats; however, any desirable number can be utilized. Also, if beneficial, different supports as shown in FIGS. 1–9 can be used to provide varied effects. The wire used for all of the supports disclosed herein must be flexible enough so that they can be bent and manufactured into the proper configuration and strong enough to support the weight of the meat, fish or poultry when in use. There are many wires on the market today that satisfy these requirements. All materials used must be non-toxic and have the proper heat stability. They can be coated or uncoated wires and can be made from any material that satisfies the physical properties discussed herein.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. A support for a meat portion to be cooked which comprises a wire base support section, an intermediate section and prong means attached thereto, said base support section comprising a one-piece wire portion bent into a support having rounded end portions adapted to contact and rest on the bottom surface of a cooking vessel, said intermediate portion at a substantially higher elevation than said rounded end portions and having a meat support surface on both sides adjacent said prong means and wherein said base support section is constructed in such a manner to permit said support to fall on its side when not in use.

2. The support of claim 1 wherein said support contains one prong.

3. The support of claim 1 wherein said support contains more than one prong.

4. The support of claim 1 wherein said support is constructed primarily from one piece of wire and wherein said prong means is integral therewith and a terminal portion thereof.

5. The support of claim 1 wherein the support is constructed from a single piece of wire having a separate pieced prong permanently attached thereto.

6. A support for a meat portion to be cooked, which comprises a wire base support section and prong means attached thereto, said base support section comprising a one piece wire portion bent into a support having a pair of rounded end portions adapted to contact and rest in rounded point contact with the bottom surface of a cooking pan, and having an integral intermediate portion at a substantially higher elevation than said rounded end portions, said end portions and said intermediate portion forming approximately a semi-circle when viewed in side elevation, and an upwardly directed prong extending from said intermediate portion for piercing engagement with said meat portion.

7. The support of claim 6 wherein one piece wire construction is used wherein one end of said wire construction is said prong and the other end of said wire terminating at a point immediately adjacent the base of said prong.

8. The support of claim 6 wherein the wire portion is in the form of a substantial semi-circle wherein the curved portion of said semi-circle is adapted to contact said surface of said cooking pan.

9. The support of claim 6 wherein the wire portion is in the form of a double looped base having a raised portion defining a raised semi-circle when viewed in side elevation, and said prong extending vertically from about the apex of said raised semi-circle.

10. The support of claim 6 having one prong.

11. The support of claim 6 having more than one prong.

12. The support of claim 6 having a prong base support.

13. A support for a meat portion to be cooked which comprises a one piece wire structure, said one piece wire structure comprising at one end a prong extending vertically from the remainder of said support, and the opposite wire end defining the terminal portion of said remainder, the wire portion between each of said wire ends defining a base support section, said base support section having the configuration of a semi-circle when viewed in side or end elevation and comprising two rounded end portions having a raised intermediate section therebetween, said intermediate section at a substantially higher elevation than said rounded end portions, said prong projecting upwardly from about the midpoint of said intermediate section and permanently attached thereto.

14. The support of claim 13 having a configuration wherein the base support section comprises two rounded end portions having a semicircular configuration when viewed in end perspective, and having therebetween two parallel wire portions upon which the meat portion will rest when in use.

15. The support of claim 13 wherein the base support section comprises two rounded end portions having a semicircular configuration when viewed in end perspective, and having therebetween two parallel wire portions upon which the meat portion will rest when in use, and wherein a cross wire section connects said parallel wire portions at approximately their midpoints.

16. The support of claim 13 wherein the base support section comprises two rounded end portions having a semicircular configuration when viewed in end perspective, and having therebetween two parallel wire portions upon which the meat portion will rest when in use, and wherein a cross wire section integral with said prong partially bisects the space between said two parallel wire portions.

* * * * *